United States Patent [19]

Iwata

[11] Patent Number: 4,817,078

[45] Date of Patent: Mar. 28, 1989

[54] CLEANING APPARATUS FOR A PICK UP LENS OF COMPACT DISC PLAYER USING A FRONT LOADING BASE

[75] Inventor: Hohji Iwata, Gotenba, Japan

[73] Assignee: Kyowa Sonic Co., Ltd., Shizuoka, Japan

[21] Appl. No.: 211,901

[22] Filed: Jun. 27, 1988

[30] Foreign Application Priority Data

Apr. 25, 1988 [JP] Japan ............................... 63-54979[U]

[51] Int. Cl.$^4$ ......................... G11B 7/12; G11B 33/00
[52] U.S. Cl. .................................... 369/71; 369/292; 15/DIG. 12
[58] Field of Search ..................... 369/71, 292, 72, 73, 369/74; 360/128; 15/DIG. 12

[56] References Cited

U.S. PATENT DOCUMENTS 4,663,686 5/1987 Freeman et al. ..................... 360/128
4,682,257 7/1987 Neuman ............................. 360/128

FOREIGN PATENT DOCUMENTS 61-153130 9/1986 Japan .
61-1237236 10/1986 Japan .

*Primary Examiner*—Steven L. Stephan
*Attorney, Agent, or Firm*—Stevens, Davis, Miller & Mosher

[57] ABSTRACT

A cleaning apparatus for a pick-up lens of a compact disc player using a front loading base having a similar shape and size to the compact disc record and a cleaner brush fixed in a "lead in" position when it is put in the player body. The cleaning apparatus on the loading base is put in the player body with the cleaner brush being positioned over the pick up lens.

6 Claims, 8 Drawing Sheets

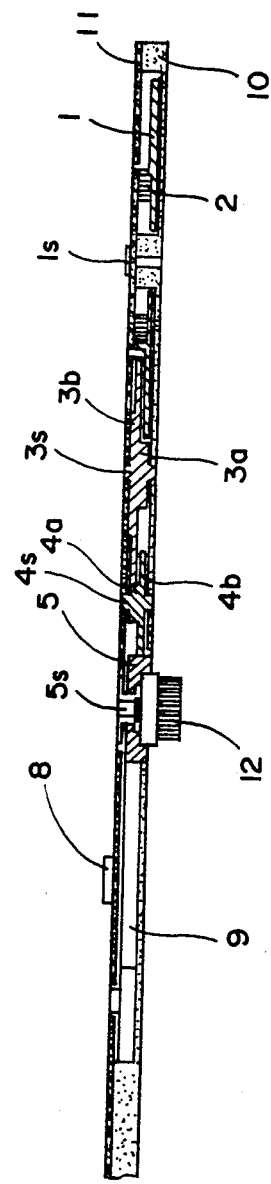
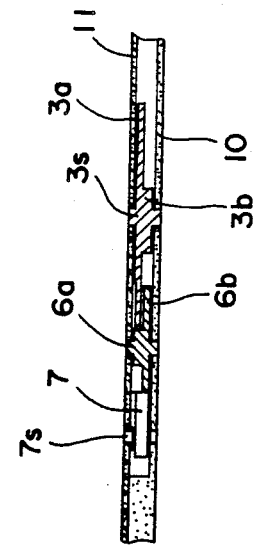
FIG. 3
FIG. 3a

4,817,078

CLEANING APPARATUS FOR A PICK UP LENS OF COMPACT DISC PLAYER USING A FRONT LOADING BASE

FIELD OF THE INVENTION

The present invention relates to a cleaning apparatus for a pick up lens of a compact disc player using a front loading base to carry a compact disc record.

BACKGROUND OF THE INVENTION

A pick up lens of a compact lens disc using a front loading base to carry a compact disc record which is provided inside the compact disc player body is very hard to clean.

When the pick up lens becomes dirty, performance errors by the compact disc record often occur.

SUMMARY OF THE INVENTION

For solving the problem in connection with cleaning a pick up lens of a compact disc using a front loading base, it was noted that the pick up lens of the compact disc stayed in a position of "lead in" when the performance was stopped.

Based on the above notice, this invention deviced a cleaner body, similar shape and size to a compact disc record. This cleaner body comprises following means.

(a) a spiral spring gear windable on its axis, a planet gear revolving around said spring gear, a cleaner gear to which is fixed a cleaner brush; the cleaner brush projecting beyond the bottom face of the cleaner body, gears transmitting rotation of the spring gear to the cleaner gear when the spiral spring unwinds, a stopper to stop reverse rotation of the cleaner gear when the spiral spring is wound, a stopper releasing spring to release said operation of the stopper and a braking tool to brake the unwinding speed of the spiral spring.

(b) means reserving rotating energy of said cleaner brush by winding up the spiral spring in condition stopping reverse rotation of the cleaner gear, (c) means said condition stopping reverse rotation of the cleaner gear being canceled by operation of said stopper releasing spring and the cleaner brush being rotated for cleaning the pick up lens.

The present invention has an advantage in that, when the user inserts the cleaner body into the player body, the pick up lens in the player body is automatically cleaned.

BRIEF DESCRIPTION OF THE SEVERAL VIEWS OF THE DRAWINGS

FIG. 3 shows transmission system of gears comprised in the cleaner body in a vertical section.

FIG. 3a shows transmisshion system related to an ankle.

DETAILED DESCRIPTION OF THE PREFERRED EMBODIMENT

Figure 1:
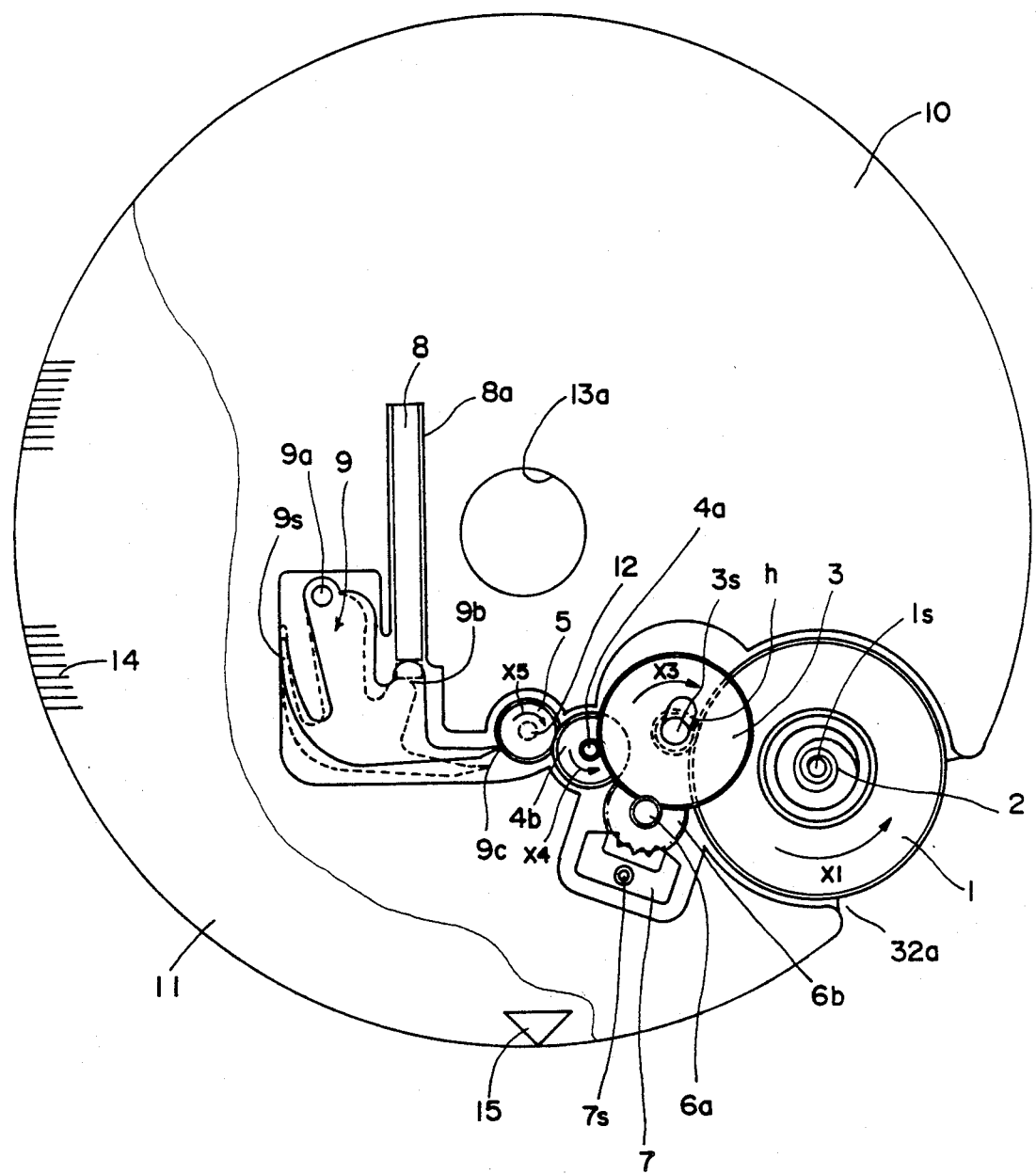
FIG. 1 shows a cleaner body in plan view partly cut open prior to winding.

The present invention is related to a cleaning apparatus for cleaning a pick up lens of a compact disc using a front loading base.

FIGS. 1-8 show a first embodiment of the present invention.

Construction of the Apparatus

Construction of the apparatus of the present invention is as follows.

As shown in FIGS. 1-5, a cleaner body 32 consists of a housing 10 and a cover 11 covering the housing 10 and is made in disc shape of similar size and shape to a compact disc record. Housing 10 has a base pad 10r.

The cleaner body 32 comprises a spring gear 1 attached a spiral spring wound around its axis 1s, a planet gear 3, middle gear 4 and cleaner gear 5 attached a cleaner brush 12. The axes of gears 3, 4 and 5 are 3s, 4s and 5s, respectively.

As shown in FIG. 3, rotation of the spring gear 1 is transmitted to the cleaner gear 5 via a small diameter part 3a, a large diameter part of the planet gear 3, a small diameter part 4a and a large diameter part of the middle gear 4.

In FIG. 1, 32a is a recess for exposing the spring gear 1.

On the other hand, rotation of the planet gear 3 is transmitted to an ankle 7 via a small diameter part 6a and a large diameter part 6b of the escape gear 6.

Figure 4:
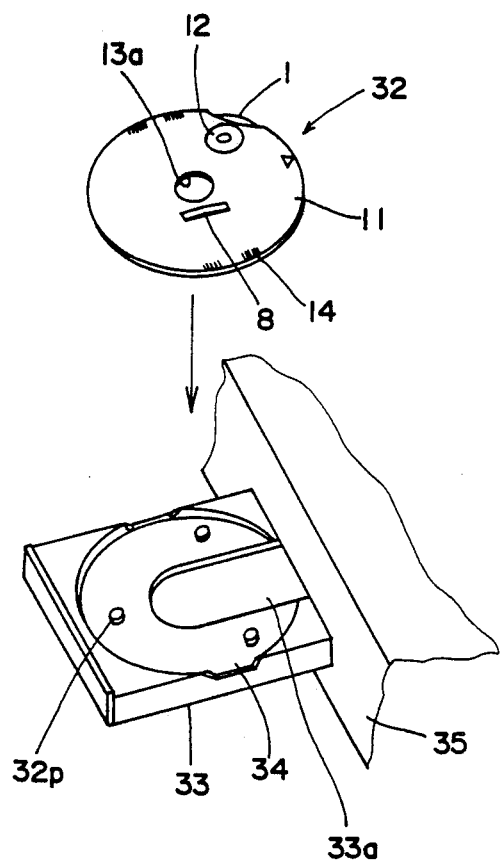
FIG. 4 shows a sketch of a front loading base.
Figure 7:
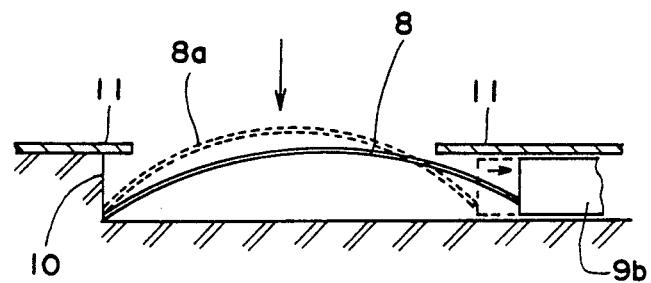
FIG. 7 shows the stopper releasing spring in two positions.

As shown in FIG. 4 and the dotted line of FIG. 7, the stopper releasing spring 8 projects beyond the top face of cover 11 through a window 8a when it is not operating. Namely, the stopper releasing spring 8 does not push a projecting portion 9b of the stopper 9 in its position of FIG. 1.

Figure 2:
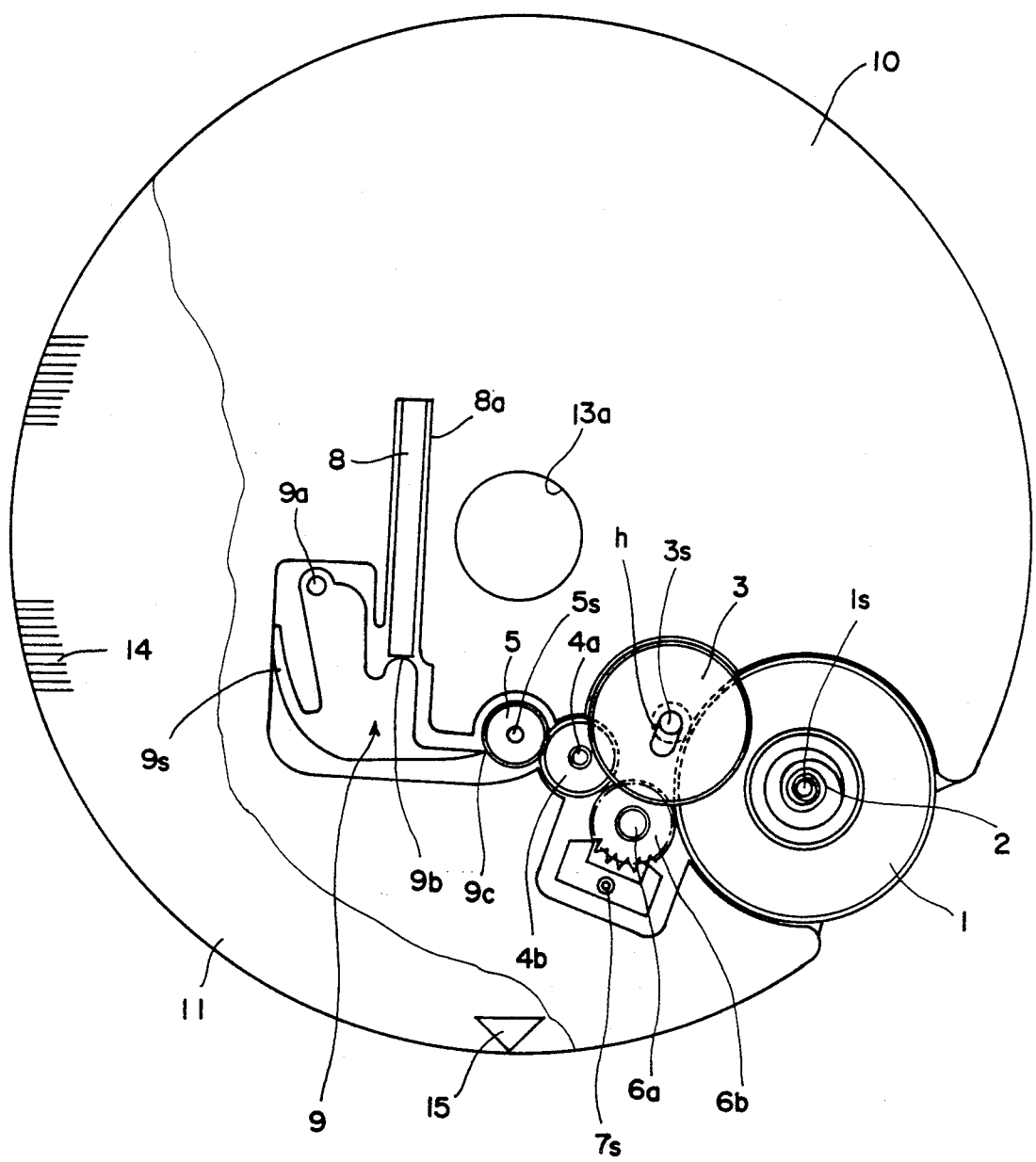
FIG. 2 shows the cleaner body of FIG. 1 in plan view partly cut open during winding.

The point 9c of the stopper is springily engaged with the tooth of the cleaner gear 5, because the stopper 9 is forced to revolve towards the cleaner gear 5 around an axis 9a acting as a pivot by elasticity of a spring part 9s of FIG. 1 and FIG. 2.

Figure 5:
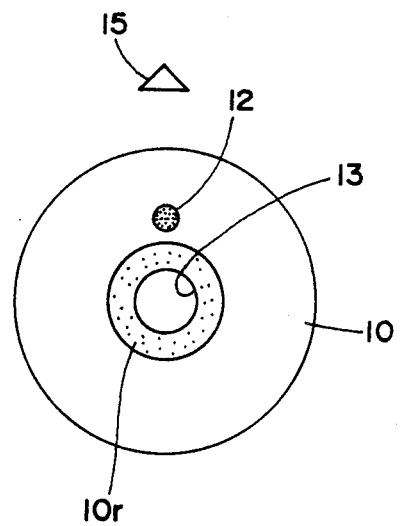
FIG. 5 shows a bottom face of the cleaner body.

As shown in FIG. 3, FIG. 5, the cleaner brush 12 projects beyond the bottom face of the housing 10.

In FIG. 1, h is an elongated aperture punched in the housing 10 and cover 11; an axis 3s of the planet gear 3 is put in said long hole h. The axis 3s of the planet gear 3 moves along the elongated aperture h as mentioned later on.

Winding Up of the Spiral Spring

First, the user rotates the spring gear 1 in a direction reverse to the arrow $x_1$ of FIG. 1 by the finger, which also rotates planet gear 3 in a direction reverse to arrow $x_3$ of FIG. 1. As a result of the rotation, the planet gear 3 revolves around the spring gear 1 and moves from a position of FIG. 1 to one of FIG. 2. Consequently, axis 3s of the planet gear 3 moves in the elongated aperture h from a position of FIG. 1 to one of FIG. 2.

With this movement there is disengagement between the planet gear 3 and the escape gear 6 and between the planet gear 3 and middle gear 4 as shown in FIG. 2.

When the user interrupts the winding of the spiral spring 2, the spring gear 1 rotates in the direction of arrow $X_1$ of FIG. 1. Consequently, the planet gear 3 revolves around the spring gear 1 and moves from the position of FIG. 2 to one of FIG. 1 to engage with the escape gear 6 and middle gear 4 as shown in FIG. 1. Then, the planet gear 3, the middle gear 4 and the cleaner gear 5 try to rotate in the direction of an arrow $X_3$, $X_4$, and $X_5$ respectively by a force of the wound spiral spring 2.

However, as the cleaner gear 5 engages with the point 9c of the stopper 9 at this time, the cleaner gear 5 cannot rotate in reverse direction of an arrow $X_5$ of FIG. 1.

Also, the planet gear 3, middle gear 4 and escape gear 6 do not rotate.

As above-mentioned, the force winding of the spiral spring 2 around the axis 1s of the spring gear 1 does not unwind but is reserved.

Setting of the Cleaner Body

Figure 6A:
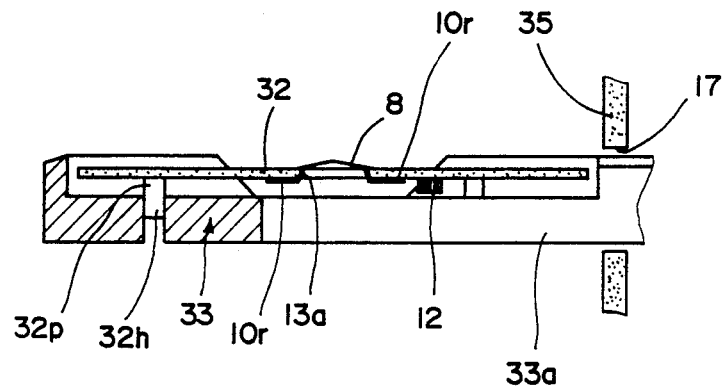
FIG. 6a shows a side view of a front loading base.
Figure 8:
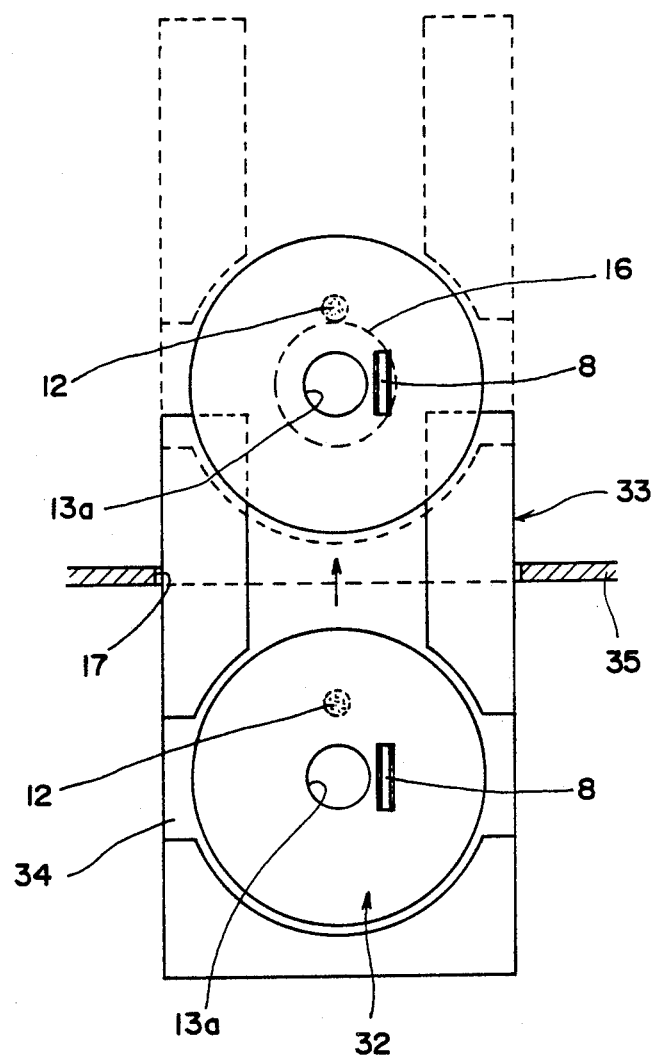
FIG. 8 shows a plan view of the front loading base being put into the player body.

As shown in FIG. 4, FIG. 6a, FIG. 8, the cleaner body 32 while the sprial spring 2 is wound is placed on the front loading base 33 in the same way as is the compact disc record. When the user places the cleaner body 32 onto the front loading base, the user aligns the lines 14 on the cover 11 with the grooves 34 for removing the compact disc record from the base 33.

Figure 6B:
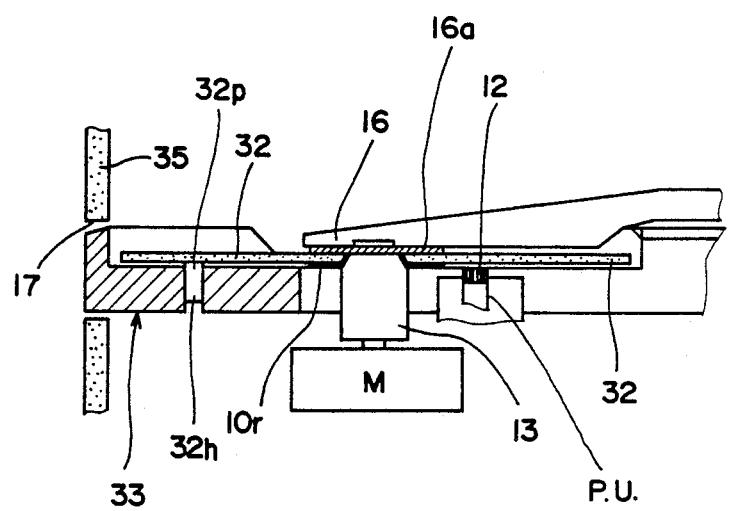
FIG. 6b shows the front loading base after insertion into a player body in side view.

In FIGS. 6a and 6b, 32p is a post for supporting the cleaner body 32; said post 32p is carried by the cleaner body 32 and inserted in a hole 32h. 33a is a recess of the loading base 33.

The stopper releasing spring 8 projects out of a window 8a of the top face of the cover 11, but can pass a doorway 17 of a player body 35 without a hitch as shown in FIGS. 6a, 6b.

Cleaning of the Pick Up Lens

When the front loading base 33 carrying the cleaner body 32 is put into the player body 35 as shown by an arrow 15 (FIG. 8), arm clamp 16 is lowered and a clamp pad 16a presses on the cleaning body 32 as shown in FIG. 6b, FIG. 8. Then the posts 32p sink into the holes 32h by a mechanism of the player body 35.

Finally, the operating axis of motor M is inserted into the operating axis hole 13a.

The insertion of the motor shaft results in the clamp pad 16a pressing against the stopper releasing spring 8 like FIG. 7 to extend spring 8.

The stopper releasing spring 8 pushes the projecting part 9b of the stopper 9, whereby the stopper 9 pivots around pivot 9a and moves in the direction of the dotted line of the FIG. 1.

Stopper 9 is thus disengaged from the cleaner gear 5.

At this time, the cleaning brush 12 is positioned over the pick up lens P.U. i.e. in the "lead in" of the non-operating position of the pick up lens P.U.

In this position spring gear 1 rotates in the direction of the arrow $X_1$ of FIG. 1 by the unwinding of spiral spring 2.

At this time, planet gear 3 moves back from the position of FIG. 2 to the position of FIG. 1, and engages with the middle gear 4 and escape gear 6. Thus, the energy of the wound spiral spring 2 is transmitted to the cleaner gear 5, and the cleaner brush 12 is rotated during unwinding of spiral spring 2 to clean the pick up lens P.U.

At this time, the cleaner gear 5 and middle gear 4 respectively rotate in the direction of the arrow $X_5$ and $X_4$.

As the planet gear 3 engages with the escape gear 6, the ankle 7 is operated by the escape gear 6 and swings around the ankle axis 7s acting as a pivot.

As a result, the teeth of the ankle 7 intermittently engage the escape gear 6 and break the rotational speed of the planet gear 3 when the spiral spring 2 is being unwound.

Consequently, the speed of the unwinding of the spiral spring 2 is adjusted and the pick up lens P.U. is cleaned by the moderate rotational speed of the cleaning brush 12.

The Second Embodiment

Figure 10:
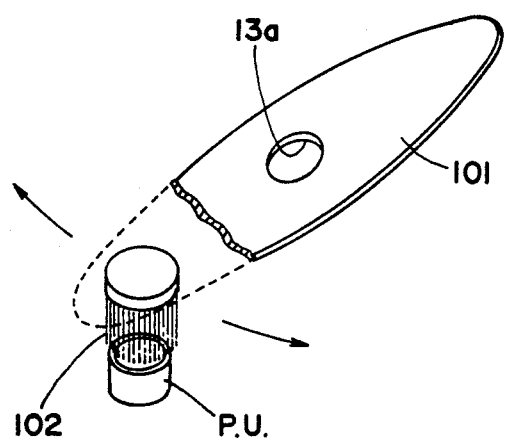
FIG. 10 explains actual operation of said second embodiment of a cleaner body by a skeletonized drawing.
Figure 9:
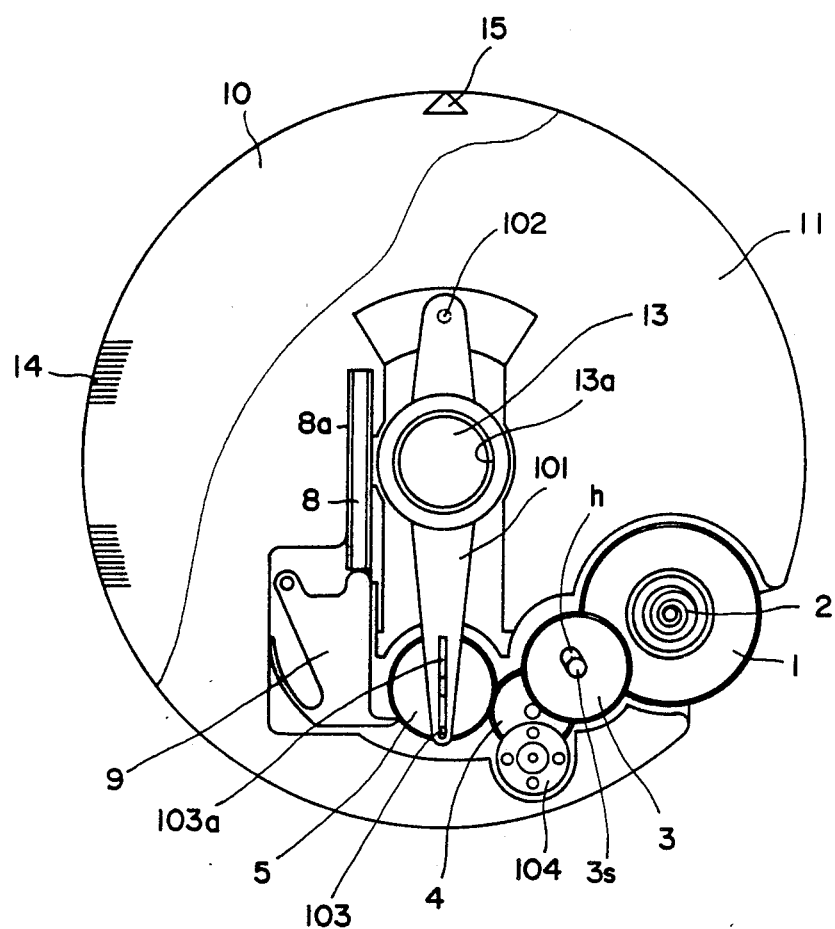
FIG. 9 shows a plan view of second embodiment of a cleaner body partly cut open.

In FIG. 9 and FIG. 10 a second embodiment is shown.

The second embodiment uses the cleaner gear 5 of the first embodiment for operating the swinging lever 101 to which is fixed a cleaner brush 102.

The cleaner brush 102 is fixed to the one end of the swinging lever 101, and the elongated aperture 103a is punched in the other end of the swinging lever 101.

A pin 103 eccentrically built on the top face of the cleaner gear 5 is put into the elongated aperture 103a and, when the cleaner gear 5 is rotated, the swinging lever is swung around the compact disc record axis 13 acting as a pivot. Then, the cleaning brush 102 cleans the pick up lens P.U., swinging in the direction of left and right like FIG. 10.

In the second embodiment, instead of the escape gear 6 and ankle 7 of the first embodiment, the air pressure adjusting wheel 104 is used.

In this embodiment, the cleaner brush 102 sweeps and drops dusts on the pick up lens P.U. to both sides of it.

So, effect of cleaning is very well, because dusts do not remain on the pick up lens P.U.

Although illustrative embodiments of the invention have been described in detail with reference to the accompanying drawings, it is to be understood that the invention is not limited to those precise embodiments. Various changes may be effected therein by those skilled in the art without departing from the scope and spirit of this invention.

What is claimed:

1. A cleaning apparatus for a pick up lens of a compact disc player using a front loading base, comprising:
    a disc shaped body, having a top and bottom and housing a spring gear, a windable spiral spring mounted on said spring gear to rotate said spring gear,
    a cleaner gear, a cleaner brush interconnected to said cleaner gear, said cleaner brush projecting from the bottom of said disc shaped body,
    intermediate gears interconnecting said spring gear and said cleaner gear to transmit rotation of said spring gear to said cleaner gear,
    a stopper to prevent reverse rotation of the cleaner gear during winding of the spiral spring, and
    a stopper releasing spring to push and release the stopper and permit rotation of the cleaner gear.

2. The apparatus as claimed in claim 1, wherein said intermediate gears transmitting rotation of the spring gear to the cleaner gear comprises a braking means to brake the rotating speed during unwinding of the spiral spring.

3. The apparatus as claimed in claim 2, wherein said intermediate gears transmitting rotation of the spring gear to the cleaner comprise a planet gear revolvable on the periphery of said spring gear, said planet gear in one position being interconnected to other intermediate gears to transmit rotation of the spring gear to the cleaner gear during unwinding of said spiral spring, and said planet gear in a second position being interconnected to other intermediate gears to not transmit rotation of the spring gear to the cleaner gear during winding of said spiral spring.

4. The apparatus as claimed in claim 1, wherein said braking mean is an ankle engaged with one of said intermediate gears transmitting rotation of the spring gear to the cleaner gear.

5. The apparatus as claimed in claim 1, wherein said cleaner gear rotates said cleaner brush.

6. A cleaning apparatus for a pick up lens of a compact disc player using a front loading base, comprising:
- a disc shaped body having a top, bottom and defining a central orifice,
- said body housing a spring gear, a windable spiral spring mounted on said spring gear to rotate said spring gear,
- a cleaner gear having an eccentrically mounted pin thereon,
- a cleaner brush interconnected to said cleaner gear,
- a pivotal lever having first and second ends and pivotal intermediate said ends about said central orifice,
- said first end having a longitudinal slot therein into which slides said pin, said second end having said cleaner brush fixed thereto, said cleaner brush projecting from the bottom of said disc shaped body, intermediate gears connecting said spring gear and said cleaner gear to transmit rotation of said spring gear to said cleaner gear,
- a stopper to prevent reverse rotation of the cleaner gear during winding of the spiral springs, and
- a stopper release spring to push and release the stopper and permit rotation of said cleaner gear.

* * * * *